United States Patent
Seo

(10) Patent No.: US 11,850,902 B2
(45) Date of Patent: Dec. 26, 2023

(54) STRUT SUSPENSION SYSTEM

(71) Applicant: CENTRAL CORPORATION, Changwon-si (KR)

(72) Inventor: Sun Min Seo, Changwon-si (KR)

(73) Assignee: CTR CO., LTD., Changwon-si (KR)

( * ) Notice: Subject to any disclaimer, the term of this patent is extended or adjusted under 35 U.S.C. 154(b) by 175 days.

(21) Appl. No.: 17/437,785

(22) PCT Filed: May 27, 2020

(86) PCT No.: PCT/KR2020/006845
§ 371 (c)(1),
(2) Date: Sep. 9, 2021

(87) PCT Pub. No.: WO2020/242192
PCT Pub. Date: Dec. 3, 2020

(65) Prior Publication Data
US 2022/0153079 A1    May 19, 2022

(30) Foreign Application Priority Data

May 27, 2019 (KR) .................. 10-2019-0062135

(51) Int. Cl.
*B60G 15/06* (2006.01)
*B60G 3/20* (2006.01)
(Continued)

(52) U.S. Cl.
CPC ............ *B60G 15/062* (2013.01); *B60G 3/20* (2013.01); *B60G 7/005* (2013.01); *B60G 21/055* (2013.01);
(Continued)

(58) Field of Classification Search
CPC .. B60G 2204/4304; B60G 2204/45021; B60G 2200/142
See application file for complete search history.

(56) References Cited

U.S. PATENT DOCUMENTS 3,219,372 A * 11/1965 Herbenar ................ B62D 7/16
280/93.508
4,274,654 A * 6/1981 Travaglio ............... B60G 15/07
280/791
(Continued)

FOREIGN PATENT DOCUMENTS

JP    H05169943 A    7/1993
JP    2003118345 A    4/2003
(Continued)

OTHER PUBLICATIONS

International Search Report of PCT/KR2020/006845, dated Sep. 3, 2020, English translation.

*Primary Examiner* — Paul N Dickson
*Assistant Examiner* — Timothy Wilhelm
(74) *Attorney, Agent, or Firm* — STIP Law Group, LLC

(57) ABSTRACT

The present invention is directed to providing a strut suspension system configured to improve a steering property by reducing steering frictional resistance when a steering wheel is rotationally manipulated and having a relatively simple mechanical structure to reduce the number of components and manufacturing costs and to secure a large space for installing main components such as an engine and the like. Disclosed is a strut suspension system configured to absorb impact and vibrations transferred to a vehicle body from a road surface through a wheel. The strut suspension system includes a strut provided between the vehicle body and the wheel and to which a knuckle arm connecting a steering system of a vehicle to the wheel is connected to be relatively rotatable when the steering system performs steering and a stabilizer link having one end connected to a stabilizer bar configured to increase roll rigidity of the vehicle body and the other end coupled to prevent the strut from rotating.

6 Claims, 10 Drawing Sheets

(51) Int. Cl.
*B60G 7/00* (2006.01)
*B60G 21/055* (2006.01)

(52) U.S. Cl.
CPC .. *B60G 2204/416* (2013.01); *B60G 2204/422* (2013.01); *B60G 2206/427* (2013.01); *B60G 2206/50* (2013.01); *B60Y 2304/05* (2013.01)

(56) References Cited

U.S. PATENT DOCUMENTS

| | | | | |
|---|---|---|---|---|
| 4,377,298 A * | 3/1983 | Finn | ............ | B60G 15/062 280/124.145 |
| 4,545,601 A * | 10/1985 | Muller | ............ | B60G 3/26 267/67 |
| 4,582,338 A * | 4/1986 | Colanzi | ............ | F16F 9/54 301/125 |
| 4,583,759 A * | 4/1986 | Kami | ............ | B60G 3/20 280/124.136 |
| 4,648,623 A * | 3/1987 | Cameron | ............ | B60G 15/14 280/86.754 |
| 4,690,234 A * | 9/1987 | Takada | ............ | B62M 27/02 267/273 |
| 4,753,455 A * | 6/1988 | Murakami | ............ | B60G 15/062 280/124.138 |
| 4,784,406 A * | 11/1988 | Stinson | ............ | B60G 3/205 280/124.149 |
| 4,844,505 A * | 7/1989 | Higuchi | ............ | B60G 3/265 280/124.145 |
| 4,871,187 A * | 10/1989 | Schaible | ............ | B60G 15/062 280/124.136 |
| 4,883,287 A * | 11/1989 | Murakami | ............ | B60G 3/265 280/124.135 |
| 4,944,524 A * | 7/1990 | Achenbach | ............ | F16F 1/505 267/221 |
| 4,962,834 A * | 10/1990 | Miner | ............ | B60G 15/067 267/221 |
| 4,995,633 A * | 2/1991 | Santo | ............ | B60G 15/062 280/124.145 |
| 5,180,180 A * | 1/1993 | Yamashita | ............ | B60G 3/00 280/93.512 |
| 5,192,100 A * | 3/1993 | Rumpel | ............ | B60G 15/07 280/124.154 |
| 5,228,717 A * | 7/1993 | Perkins | ............ | B60G 13/006 280/124.148 |
| 5,326,084 A * | 7/1994 | Mevissen | ............ | B60G 15/063 267/221 |
| 5,498,018 A * | 3/1996 | Wahl | ............ | B60G 3/26 280/124.138 |
| 5,622,242 A * | 4/1997 | Handke | ............ | B60G 15/062 188/322.19 |
| 5,772,168 A * | 6/1998 | Nakazawa | ............ | B60G 13/006 248/300 |
| 5,782,484 A * | 7/1998 | Kuhn, Jr. | ............ | B60G 3/265 267/248 |
| 5,797,618 A * | 8/1998 | Brokholc | ............ | B60G 99/00 280/124.149 |
| 5,868,410 A * | 2/1999 | Kawabe | ............ | B60G 3/265 280/124.134 |
| 5,893,435 A * | 4/1999 | Handke | ............ | B60G 15/07 280/124.157 |
| 6,027,130 A * | 2/2000 | Kawabe | ............ | B60G 3/265 280/124.135 |
| 6,062,580 A * | 5/2000 | Kawabe | ............ | B60G 15/07 280/124.135 |
| 6,079,722 A * | 6/2000 | Kato | ............ | B60G 3/265 280/124.1 |
| 6,089,582 A * | 7/2000 | Hasshi | ............ | B62D 7/18 280/93.512 |
| 6,254,114 B1 * | 7/2001 | Pulling | ............ | F16C 7/026 403/135 |
| 6,269,920 B1 * | 8/2001 | Handke | ............ | B60G 15/07 280/124.145 |
| 6,305,701 B1 * | 10/2001 | Bobinger | ............ | B60G 21/0551 280/124.145 |
| 6,341,678 B1 * | 1/2002 | Hoyte | ............ | B60G 15/07 188/321.11 |
| 6,367,830 B1 * | 4/2002 | Annequin | ............ | B60G 15/063 280/124.145 |
| 6,533,230 B2 * | 3/2003 | Fullenkamp | ............ | B60G 15/07 248/300 |
| 6,568,696 B2 * | 5/2003 | Osborn | ............ | B62D 15/023 280/93.5 |
| 6,715,777 B2 * | 4/2004 | Sasse | ............ | B60G 15/07 267/218 |
| 6,883,816 B2 * | 4/2005 | Baker | ............ | F16C 33/586 280/93.512 |
| 7,384,053 B1 * | 6/2008 | Boecker | ............ | B60G 21/0551 280/124.152 |
| 7,490,840 B2 * | 2/2009 | Luttinen | ............ | B60G 3/06 280/124.126 |
| 7,530,586 B2 * | 5/2009 | Tardy-Tuch | ............ | B60G 13/005 280/124.145 |
| 7,614,629 B2 * | 11/2009 | Dinakaran | ............ | B60G 7/008 280/93.512 |
| 7,712,753 B2 * | 5/2010 | McCann | ............ | B60G 3/06 280/93.511 |
| 7,762,568 B2 * | 7/2010 | Tatsumi | ............ | B62D 25/082 280/124.145 |
| 7,946,602 B2 * | 5/2011 | Shimatani | ............ | B60G 21/0551 280/124.152 |
| 7,988,166 B2 * | 8/2011 | Heeren | ............ | B60G 13/006 280/124.1 |
| 8,061,726 B2 * | 11/2011 | Kunert | ............ | B60G 3/20 280/124.144 |
| 8,152,185 B2 * | 4/2012 | Siebeneick | ............ | B60G 7/008 280/124.134 |
| 8,219,284 B2 * | 7/2012 | Shinmura | ............ | B62D 9/002 701/41 |
| 8,240,688 B2 * | 8/2012 | Miyamoto | ............ | F16F 1/377 280/124.152 |
| 8,573,615 B2 * | 11/2013 | Kuwabara | ............ | B60G 3/20 280/124.145 |
| 8,579,312 B2 * | 11/2013 | Koumura | ............ | B60G 21/0551 280/124.152 |
| 8,702,113 B2 * | 4/2014 | Trotter | ............ | B60G 21/0551 280/124.152 |
| 8,708,356 B2 * | 4/2014 | Rohde | ............ | B60G 13/006 280/124.145 |
| 8,777,244 B2 * | 7/2014 | Seethaler | ............ | B60G 3/06 280/124.17 |
| 8,919,794 B2 * | 12/2014 | Kunert | ............ | B60G 21/0551 280/124.152 |
| 9,004,511 B1 * | 4/2015 | Rosepiler | ............ | B60G 21/0551 280/124.109 |
| 9,085,302 B2 * | 7/2015 | Borroni-Bird | ............ | B60T 13/74 |
| 9,499,193 B2 * | 11/2016 | Kageyama | ............ | B62D 5/046 |
| 9,580,108 B2 * | 2/2017 | Mentzel | ............ | B60G 15/07 |
| 9,676,240 B2 * | 6/2017 | Hinz | ............ | B60G 15/12 |
| 9,878,588 B2 * | 1/2018 | von Hasselbach | ...... | B60G 3/01 |
| 9,944,148 B2 * | 4/2018 | Villegas Muriel | ............ | B60G 21/0551 |
| 10,328,763 B2 * | 6/2019 | Lee | ............ | B60G 11/14 |
| 10,351,169 B2 * | 7/2019 | Zhang | ............ | B60G 11/08 |
| 10,696,124 B2 * | 6/2020 | Keuser | ............ | B60G 21/0556 |
| 10,792,967 B2 * | 10/2020 | Tamura | ............ | B60G 7/00 |
| 10,836,230 B2 * | 11/2020 | Hintzen | ............ | B60G 3/06 |
| 10,889,178 B2 * | 1/2021 | Tamura | ............ | B60K 17/043 |
| 10,906,372 B2 * | 2/2021 | Shibuya | ............ | B60K 7/0007 |
| 10,926,596 B2 * | 2/2021 | Lorenz | ............ | B60G 3/20 |
| 11,230,154 B2 * | 1/2022 | Høiland | ............ | B60G 21/0551 |
| 11,352,056 B2 * | 6/2022 | Moon | ............ | B60G 7/005 |
| 11,465,489 B2 * | 10/2022 | Nagayama | ............ | B60G 11/20 |
| 11,577,778 B2 * | 2/2023 | Kim | ............ | B60G 15/062 |
| 2002/0135213 A1 * | 9/2002 | Fullenkamp | ............ | B60G 15/063 297/311 |
| 2003/0111806 A1 | 6/2003 | Carlstedt et al. | | |
| 2004/0140640 A1 * | 7/2004 | Frantzen | ............ | B60G 21/0551 280/124.145 |

(56) References Cited

U.S. PATENT DOCUMENTS

| | | | |
|---|---|---|---|
| 2006/0214341 A1* | 9/2006 | Sugiura | F16F 1/3842 |
| | | | 267/293 |
| 2007/0001358 A1* | 1/2007 | Cummings | B60G 11/15 |
| | | | 267/219 |
| 2007/0045036 A1* | 3/2007 | Takeuchi | B62D 5/0418 |
| | | | 280/124.145 |
| 2009/0057528 A1* | 3/2009 | Moravy | F16F 9/54 |
| | | | 188/266.5 |
| 2010/0223974 A1* | 9/2010 | Kucinski | B21D 51/06 |
| | | | 72/324 |
| 2016/0009153 A1* | 1/2016 | von Hasselbach | B60G 7/001 |
| | | | 280/124.125 |
| 2018/0170140 A1* | 6/2018 | Lee | B60G 17/016 |
| 2021/0253159 A1* | 8/2021 | Toyoda | B62D 6/002 |

FOREIGN PATENT DOCUMENTS

| | | | |
|---|---|---|---|
| JP | 2015128959 A | | 7/2015 |
| KR | 20080074762 A | | 8/2008 |

* cited by examiner

STRUT SUSPENSION SYSTEM

CROSS-REFERENCE TO RELATED APPLICATIONS

This application is the U.S. National Phase under 35 U.S.C. § 371 of International Application No. PCT/KR2020/006845 filed on May 27, 2020, which in turn claims the benefit of Korean Application No. 10-2019-0062135 filed on May 27, 2019, the disclosures of which are incorporated by reference into the present application.

BACKGROUND

1. Field of the Invention

The present invention relates to a strut suspension system, and more particularly, to a strut suspension system configured to improve riding quality by absorbing impact and vibrations transferred to a vehicle body when a vehicle runs.

2. Discussion of Related Art

Generally, a vehicle includes a steering system configured to allow a driver to arbitrarily manipulate a traveling direction of the vehicle and a suspension system configured to improve a riding property by absorbing impact and vibrations transferred to a vehicle body from a road surface through a wheel.

Referring to FIG. 1, a steering system 10 includes a steering wheel 11 provided in front of a driver's seat, a steering shaft 12 connected to a bottom of the steering wheel 11, a steering gear 13 connected to the steering shaft 12 to increase torque according to a reduction gear ratio and including a rack gear and a pinion gear to convert rotational movement into linear movement, a relay rod 14 connected to the rack gear to transfer power, a tie rod 15 connected to each of both ends thereof, and a steering link 16 having both ends hinge-connected to an end of a knuckle arm 17 located to be eccentric from an end of the tie rod 15 and a rotational center of a wheel T toward one side. Also, a control arm 18 (refer to FIG. 2) connected to a frame of the wheel T using a ball joint 18a as a medium to support movement of the wheel T is provided below the knuckle arm 17.

The steering system 20 is configured to support a load of the vehicle by connecting the vehicle body to an axle of the wheels as well as absorbing impact and vibrations from the road surface and is classified into an axle suspension system and an independent suspension system depending on an axle connection type. Here, the independent suspension system is generally used in a sedan in which riding quality or control capability is significant but the axle suspension system is generally used in a large vehicle such as a bus, truck, or the like.

As a representative example of the independent suspension system, a Macpherson type and a double wishbone type are used.

Referring to FIG. 2, a conventional Macpherson type suspension system 20' includes a strut 21 integrally coupled to a knuckle arm 17 using a bolt 17a and including a shock absorber (not shown) including a cylinder and a piston rod to absorb impact and includes a coil spring 23 including a top end and a bottom end supported by a top seat 23a fixed to a top of the piston rod and a bottom seat 23b fixed to a top of the strut 21, respectively.

The conventional Macpherson type suspension system 20' configured as described above has advantages such as a simple structure, a low price, and easily securing a space for installing main components such as an engine and the like. However, in the conventional Macpherson type suspension system 20', when the knuckle arm 17 and the strut 21 are integrally coupled by the bolt 17a so as to integrally perform steering movement and suspension movement so that the wheels T rotate due to driving of the steering system 10, the knuckle arm 17 fixed to the wheel T, the strut integrally coupled to the knuckle arm 17, and components of the suspension system 20' which are sequentially coupled to the top of the strut 21 rotate together. Accordingly, weights of the rotated components excessively increase such that there are disadvantages in that steering frictional resistance increases and steering quality decreases when a driver manipulates the steering wheel 11.

Referring to FIG. 3, a conventional double wishbone suspension system 20" has a structure in which one end of a top control arm 18' and one end of a bottom control arm 18" which are configured to have a pair of V-shapes or Y-shapes are installed to be vertically spaced apart in the vehicle body and other ends of the top control arm 18' and the bottom control arm 18" are connected to the knuckle arm 17 by ball joints 19a and 19b. Other components may be configured to be equal to those described with reference to FIG. 2. In the conventional double wishbone type suspension system 20", since steering movement and suspension movement are separated, steering frictional resistance is small so that there are advantages of high steering quality and high control stability. However, since the conventional double wishbone suspension system 20" has a complicated structure, is expensive, and includes the top control arm 18' and the bottom control arm 18" together, a large installation space is occupied such that there is a disadvantage in securing a space for installing main components such as an engine and the like.

A basic structure of the double wishbone suspension system is disclosed in Korean Patent Registration No. 10-0589182, and a basic structure of the Macpherson suspension system is disclosed in Korean Patent Registration No. 10-0559884. However, in Related Documents, components configured to reduce steering frictional resistance while steering is manipulated as well as simplifying a structure of a strut suspension system are insufficient.

Meanwhile, generally, in a case in which an independent suspension system is applied to a vehicle, when the vehicle is tilted toward one side when running, a side opposite a tilted side is lifted and becomes an unstable state. In order to increase roll rigidity of a vehicle body by preventing such problems and controlling a roll amount of the vehicle body, a stabilizer bar is installed.

The stabilizer bar is disposed in a lateral direction with respect to the vehicle body, both ends of the stabilizer bar are connected to a strut of the suspension system using a stabilizer link as a medium, and the stabilizer link is connected to the strut using a triaxial rotational joint as a medium.

Due to the above components, when roll displacement is caused by a change in movement posture of the vehicle while running, the stabilizer link performs a function of providing reaction torque by supporting both ends of the stabilizer bar. Accordingly, when an external force is applied to the stabilizer bar in a distortion direction during roll displacement while the vehicle runs, the stabilizer link provides a support force in a distortion direction opposite the direction in which the external force is applied to the stabilizer bar so as to implement distortion restoration property of the stabilizer bar.

However, since the conventional stabilizer bar and stabilizer link as described above are formed in a structure of being connected to the strut using the triaxial rotational joint as a medium, the strut rotates together while steering is manipulated such that steering frictional resistance increases and steering property and control stability decrease.

Meanwhile, Japanese Patent Publications Nos. S63-022715 and H06-074283 disclose a component including a double link above a strut or including a fixing structure on an upper mount portion provided above a strut as a component configured to prevent the strut from rotating while steering is manipulated. However, in the case of the above related documents, since it is necessary to additionally include the double link or fixing structure, a structure of a suspension system becomes complicated and manufacturing costs thereof increase.

SUMMARY OF THE INVENTION

The present invention is directed to providing a strut suspension system configured to improve a steering property by reducing steering frictional resistance when a steering wheel is rotationally manipulated and having a relatively simple mechanical structure to reduce the number of components and manufacturing costs and to secure a large space for installing main components.

According to an aspect of the present invention, there is provided a strut suspension system configured to absorb impact and vibrations transferred to a vehicle body from a road surface through a wheel. The strut suspension system includes a strut provided between the vehicle body and the wheel and to which a knuckle arm connecting a steering system of a vehicle to the wheel is connected to be relatively rotatable when the steering system performs steering and a stabilizer link having one end connected to a stabilizer bar configured to increase roll rigidity of the vehicle body and the other end coupled to prevent the strut from rotating.

When the steering system performs steering, the knuckle arm and the wheel are rotated in a steering direction of the steering system, and the strut is fixed by the stabilizer link and prevented from rotating.

The strut suspension system further may comprise a support portion configured to connect and support the knuckle arm and the strut to be relatively rotatable.

The stabilizer link is integrally coupled to the support portion.

The stabilizer link is weld-coupled to the support portion.

The stabilizer link may comprise a first coupling link coupled to one surface of the support portion, a second coupling link coupled to the other surface of the support portion, and a connection link having both ends integrally connected to the first coupling link and the second coupling link, respectively.

A space through which a drive shaft configured to transfer torque to the wheel passes is formed below a second support member among the first coupling link, the second coupling link, and the connection link.

A support body, into which a rotating shaft forming a rotational center of the knuckle arm is inserted, is provided on the knuckle arm, and the support portion comprises a first support member and a second support member, which are provided at a top and bottom of the support body, into and by which the rotating shaft is inserted and supported, and into and by which the strut is inserted and supported, and the rotating shaft.

The stabilizer link is integrally coupled to at least one of the first support member and the second support member.

One side of the first support member and one side of the second support member into which the rotating shaft is inserted are provided at the top and bottom of the support body, respectively, and the other side of the first support member and the other side of the second support member into which the strut is inserted are provided on one side of the support body to come into vertical contact therewith.

The stabilizer bar and the stabilizer link are connected by a ball joint.

A control arm configured to support movement of the wheel is connected to a bottom of the knuckle arm with a ball joint as a medium.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
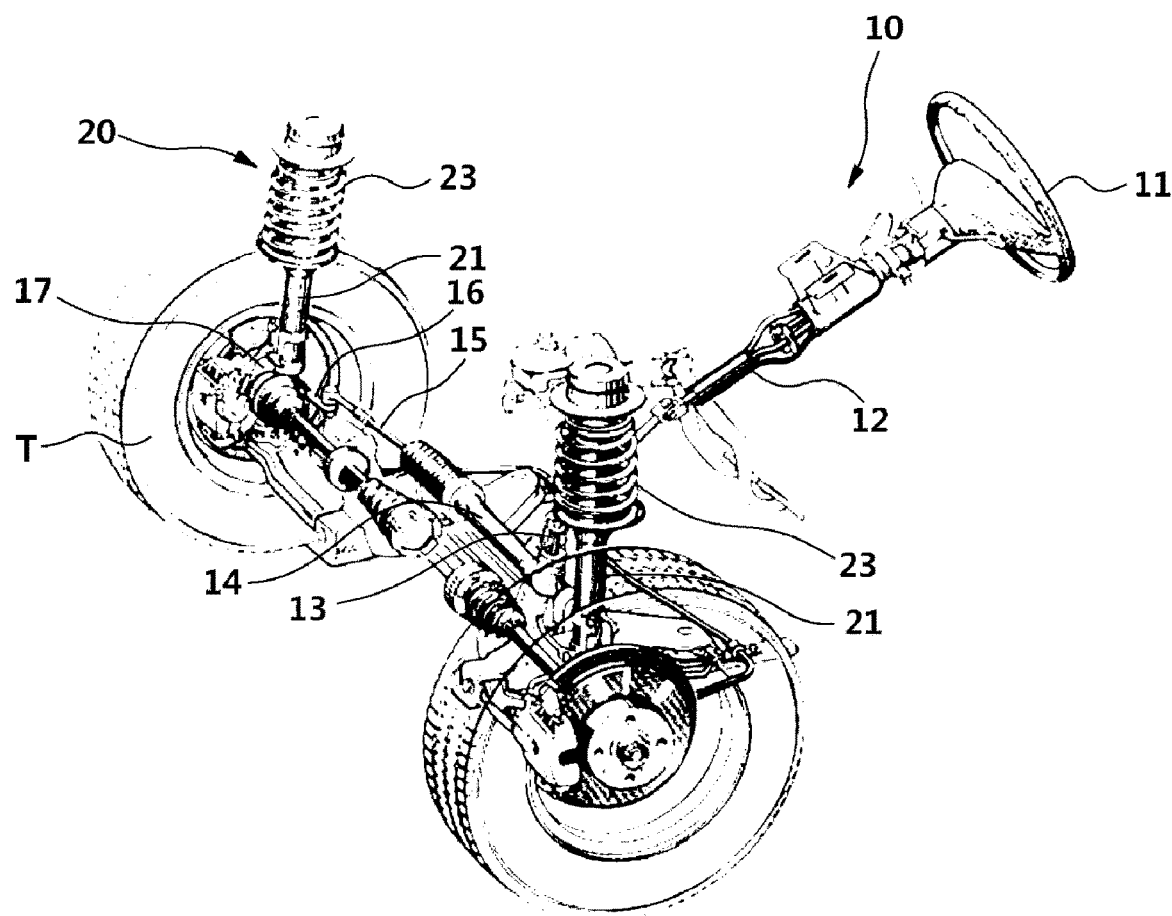
FIG. 1 is a view schematically illustrating a general steering system and suspension system for a vehicle.
Figure 2:
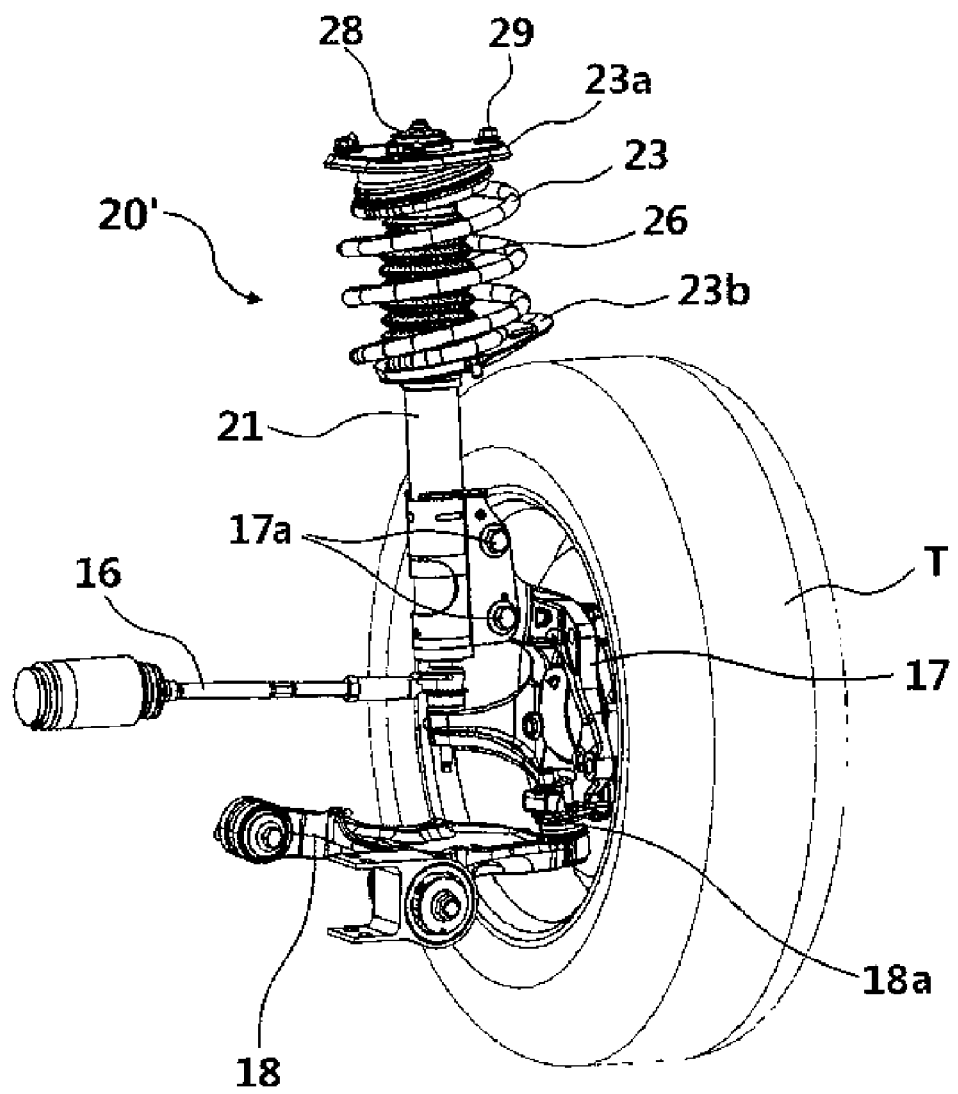
FIG. 2 is a view illustrating a conventional Macpherson type suspension system.
Figure 3:
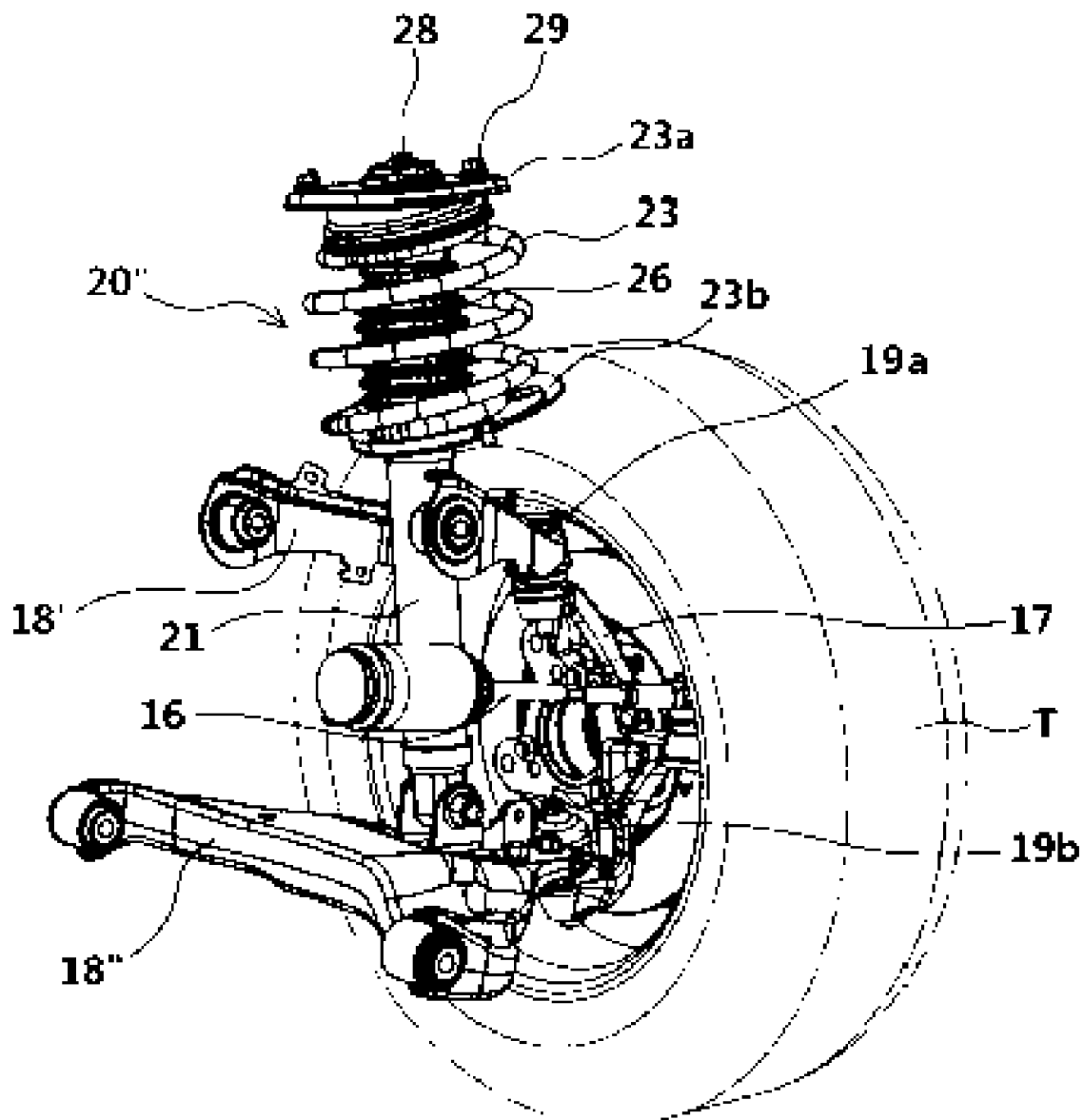
FIG. 3 is a view illustrating a conventional double wishbone type suspension system.
Figure 4:
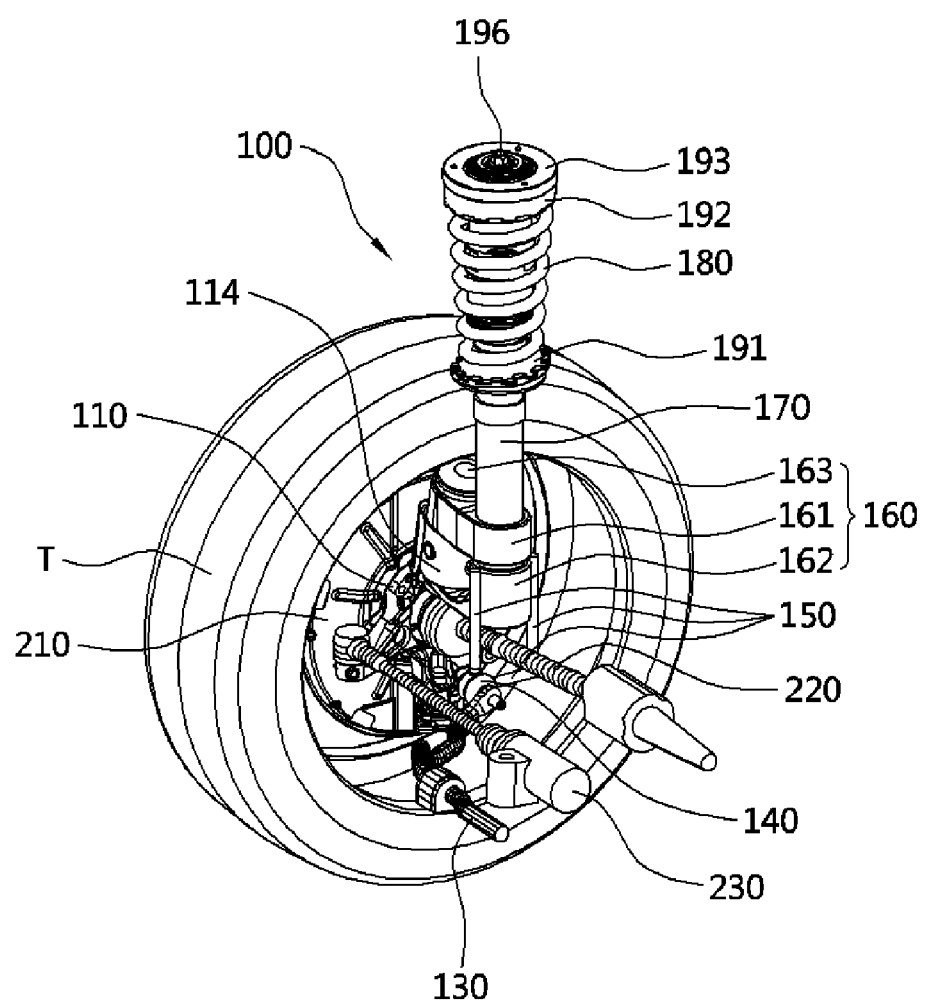
FIG. 4 is a perspective view illustrating a state in which the strut suspension system according to the present invention is coupled to a wheel.
Figure 5:
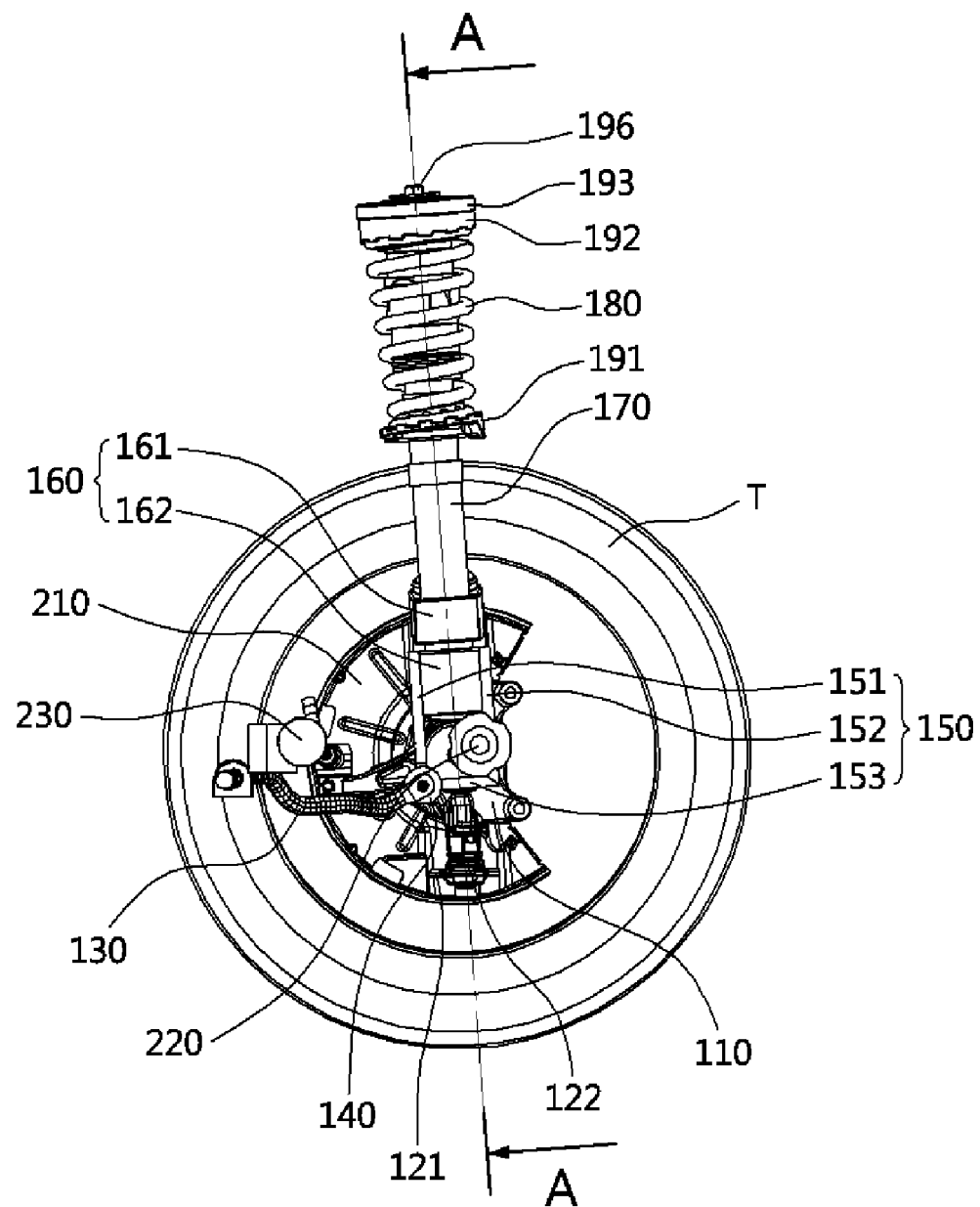
FIG. 5 is a side view of FIG. 4.

Hereinafter, components and operations of an exemplary embodiment of the present invention will be described below with reference to the attached drawings.

Referring to FIGS. 4 to 8, a strut suspension system 100 according to the present invention includes a strut 170 to which a knuckle arm 110 connecting a steering system of a vehicle to a wheel T is connected to be relatively rotatable when the steering system performs steering and which is provided between a vehicle body and the wheel T and a stabilizer link 150 having one end connected to a stabilizer bar 130 configured to increase roll rigidity of the vehicle body and the other end coupled to prevent strut 170 from rotating.

The knuckle arm 110 is fixed to a frame 210 of the wheel T so that the knuckle arm 110, the wheel T, and the frame 210 rotate together in a steering direction when the steering system performs steering.

A drive shaft through hole 111 through which a drive shaft 220 configured to transfer torque to the wheel T passes is formed in a central part of the knuckle arm 110. A ball joint coupling portion 112 is formed at a bottom end of the knuckle arm 110, and a control arm coupling portion 121, to which a control arm (not shown) supporting movement of the wheel T is coupled using a ball joint 122 as a medium, is connected to the ball joint coupling portion 112.

A steering shaft coupling portion 113 is formed at one side portion of the control arm 110, and a fastener 231 provided on one end of the steering shaft 230 included in the steering system is coupled to the steering shaft coupling portion 113.

A support body 114 having a cylindrical shape is formed at a top of the control arm 110, a rotating shaft insertion portion 114a is formed inside the support body 114 to vertically pass therethrough, and a rotating shaft 163 forming a rotational center of the knuckle arm 110, which will be described below, while steering is performed is inserted into and supported by the rotating shaft insertion portion 114a.

The control arm 110 and the strut 170 are connected and supported by the support portion 160 to be relatively rotatable.

The support portion 160 includes a first support member 161 and a second support member 162 provided on an upper part and a lower part of the support body 114 and into which the rotating shaft 163 is inserted to be supported and into which the strut 170 is inserted to be supported and the rotating shaft 163 forming the rotational center of the knuckle arm 110 while steering is performed.

A first rotating shaft insertion portion 161a into which the rotating shaft 163 is inserted is formed on one side of the first support member 161, and a first strut insertion portion 161b into which the strut 170 is inserted is formed on the other side of the first support member 161.

A second rotating shaft insertion portion 162a into which the rotating shaft 163 is inserted is formed on one side of the second support member 162, and a second strut insertion portion 162b into which the strut 170 is inserted is formed on the other side of the second support member 162.

The one side of the first support member 161 and the one side of the second support member 162 into which the rotating shaft 163 is inserted may be provided on the upper portion and the lower portion of the support body 114, respectively. The other side of the first support member 161 and the other side of the second support member 162 into which the strut 170 is inserted may be provided to come into vertical contact with each other on one side of the support body 114.

As one embodiment, the one side and the other side of the first support member 161 are formed to have the same height such that the one side of the first support member 161 is seated on a top surface of the support body 114 and the one side of the second support member 162 has a plate shape and comes into contact with a bottom surface of the support body 114. The other side of the second support member 162 has a structure protruding upward so that a top end thereof may be formed to come into contact with a bottom surface of the other side of the first support member 161.

A top end 163a of the rotating shaft 163 may be formed to have a flange shape protruding outward, and a bottom end 163b of the rotating shaft 163 may have a screw thread formed on an outer circumferential surface thereof.

The rotating shaft 163 may be sequentially inserted into and pass through the first rotating shaft insertion portion 161a of the first support member 161, the rotating shaft insertion portion 114a of the support body 114, and the second rotating shaft insertion portion 162a of the second support member 162, the top end 163a of the rotating shaft 163 may be held by a top surface of the first support member 161 on a periphery of the first rotating shaft insertion portion 161a, and the bottom end 163b of the rotating shaft 163 which protrudes downward from the second rotating shaft insertion portion 162a may be fastened to a fastening member 164 including a screw thread formed on an inner circumferential surface thereof through screw coupling.

The stabilizer bar 130 and the stabilizer link 150 may be connected by a ball joint 140. A fastening hole 131 may be formed in one end of the stabilizer bar 130, and a shaft portion 141 of the ball joint 140 may be inserted into the fastening hole 131 and coupled thereto using a fastening device (not shown).

The stabilizer link 150 may be integrally coupled to the support portion 160. As one embodiment, the stabilizer link 150 may be weld-coupled to the support portion 160.

The stabilizer link 150 may include a first coupling link 151 coupled to one surface of the support portion 160, a second coupling link 152 coupled to the other surface of the support portion 160, and a connection link 153 having both ends integrally connected to the first coupling link 151 and the second coupling link 152.

A space through which the drive shaft 220 configured to transfer torque to the wheel T passes may be formed among the first coupling link 151, the second coupling link 152, and the connection link 153 below the second support member 162 so as to increase space availability.

The stabilizer link 150 may be integrally coupled to at least one of the first support member 161 and the second support member 162. As one embodiment, the first coupling link 151 and the second coupling link 152 of the stabilizer link 150 may be weld-coupled to both surfaces of the second support member 162. Since the first coupling link 151 and the second coupling link 152 included in the stabilizer link 150 are double weld-coupled to both sides of the support portion 160 as described above, coupling strength may be increased.

The first strut insertion portion 161b formed on the other side of the first support member 161 vertically passes therethrough, and the second strut insertion portion 162b formed on the other side of the second support member 162 may have a structure including an open top and a closed bottom surface. Accordingly, the strut 170 may pass through the first strut insertion portion 161b and be inserted into the second strut insertion portion 162b, and a bottom end of the strut 170 may be seated on and supported by a bottom surface of the second strut insertion portion 162b by an elastic force of a coil spring 180 which will be described below.

Figure 6:
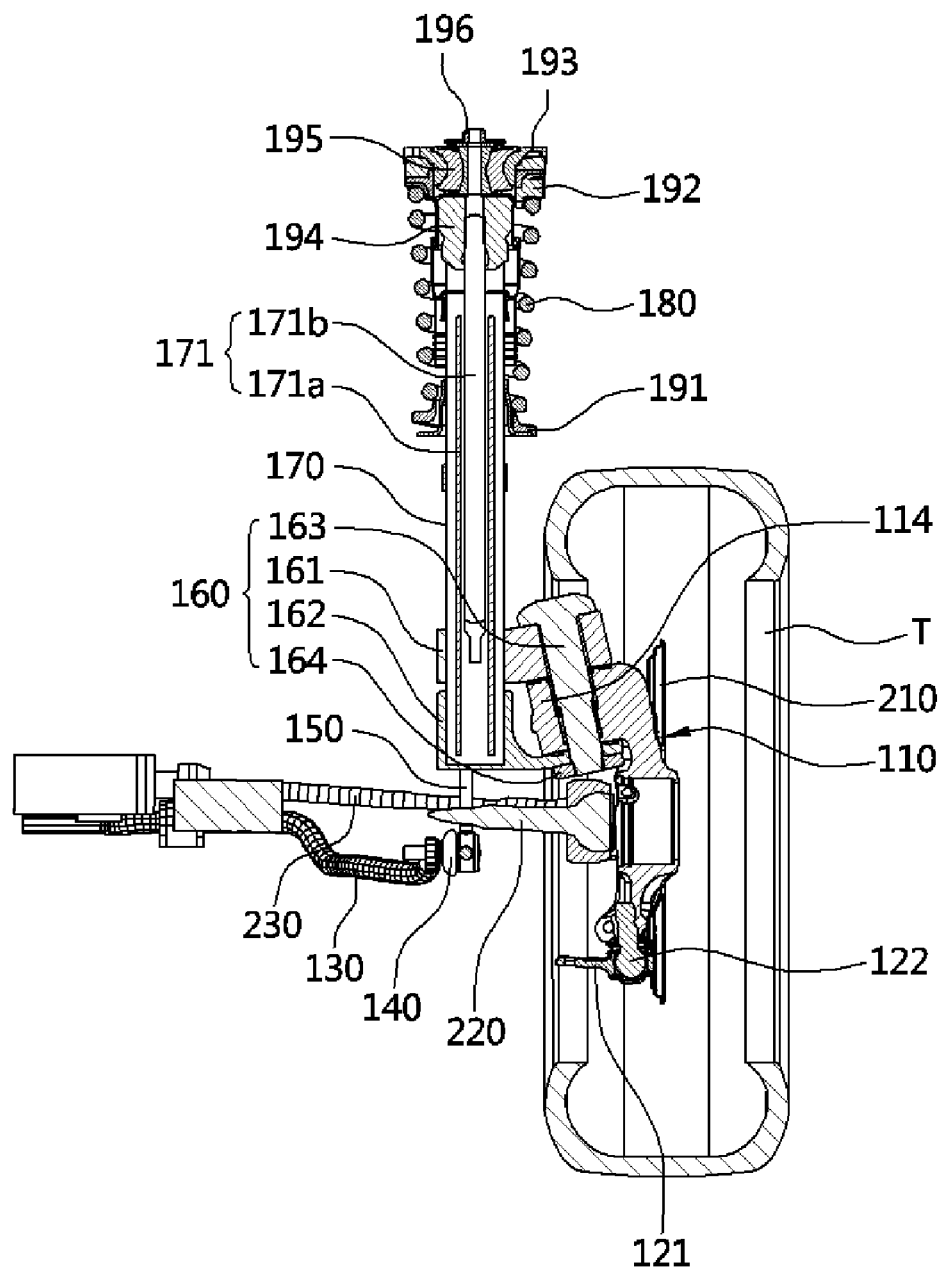
FIG. 6 is a cross-sectional view taken along line A-A of FIG. 5.
Figure 7:
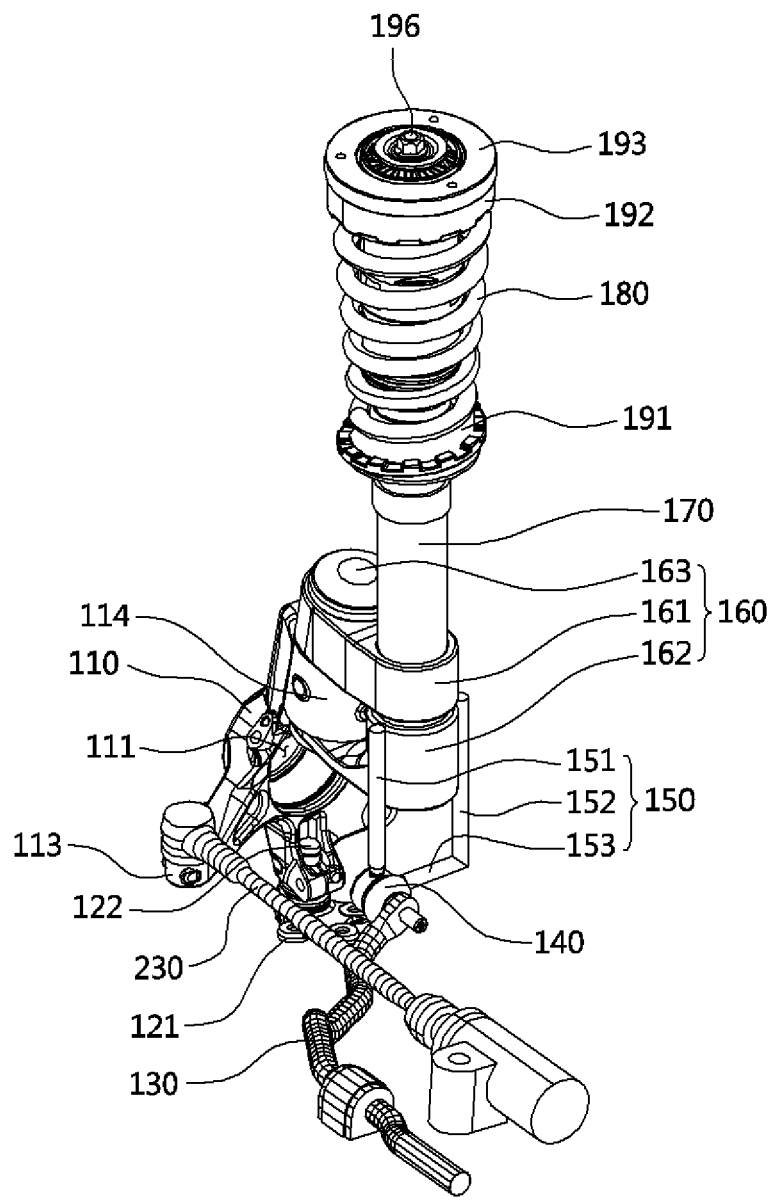
FIG. 7 is a perspective view illustrating a main part of the strut suspension system according to the present invention.
Figure 8:
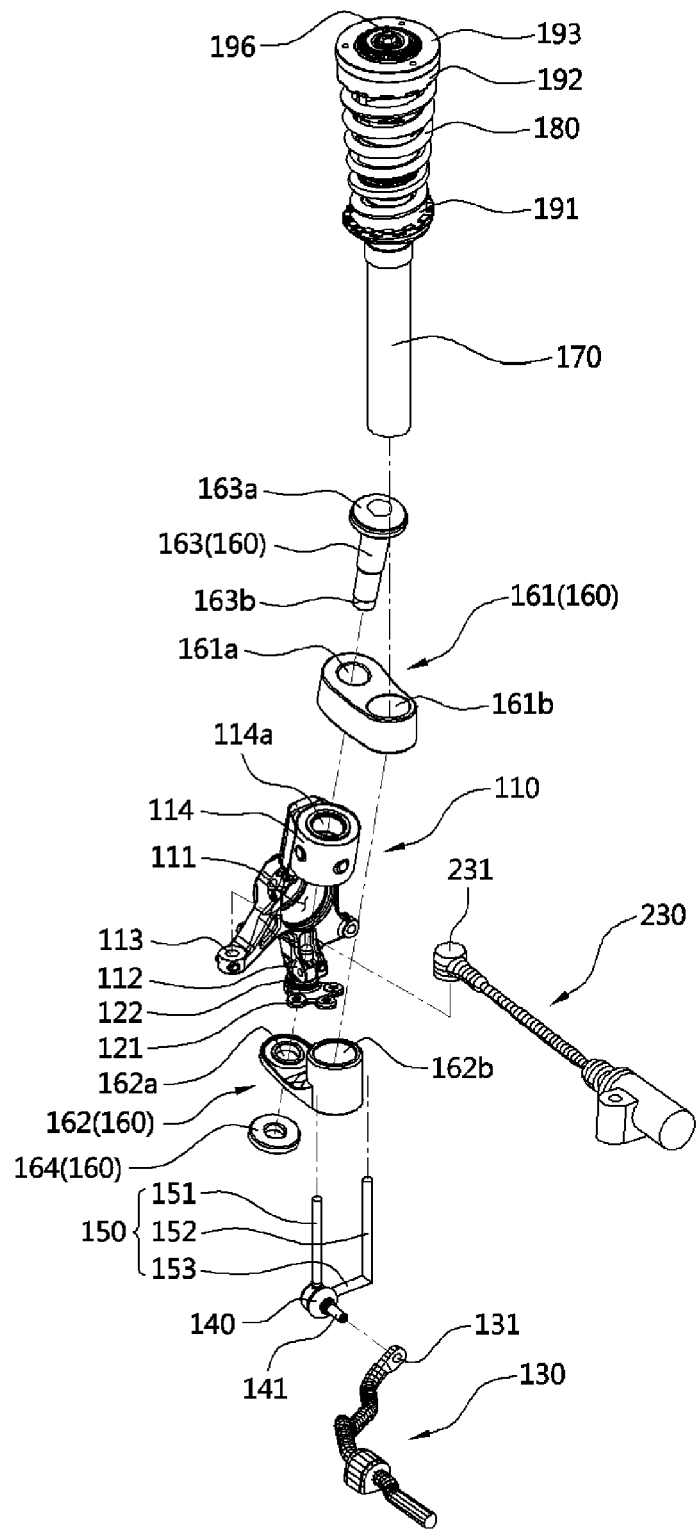
FIG. 8 is an exploded perspective view of FIG. 7.

Referring to FIG. 6, the strut suspension system 100 includes a shock absorber 171 including a cylinder 171a and a rod 171b which are built in the strut 170 to absorb a shock, the coil spring 180 having a top end and a bottom end which are supported by a top sheet 192 fixed to a top of the piston rod 171b and a bottom sheet 191 fixed to the top of the strut 170, and a mounting member 193 fixed to a bottom surface of the vehicle body of the vehicle and connected to the top sheet 192 with a rubber bush 195 interposed therebetween. Also, a buffer member 194 surrounding an outer circumferential surface of the top of the piston rod 171b may be further included on a bottom surface of the top sheet 192. Also, the top of the piston rod 171b vertically passes through a central part of the top sheet 192 while a step held by the top sheet 192 is formed on an outer circumferential surface thereof. A nut 196 passing through a central part of the mounting member 913 and held by the mounting member 193 is screw-fastened to an outer circumferential surface of a top end of the piston rod 171b so that the piston rod 171b is fixed to the vehicle body with the top sheet 192, the mounting member 193, and the rubber bush 195 as media.

Figure 9:
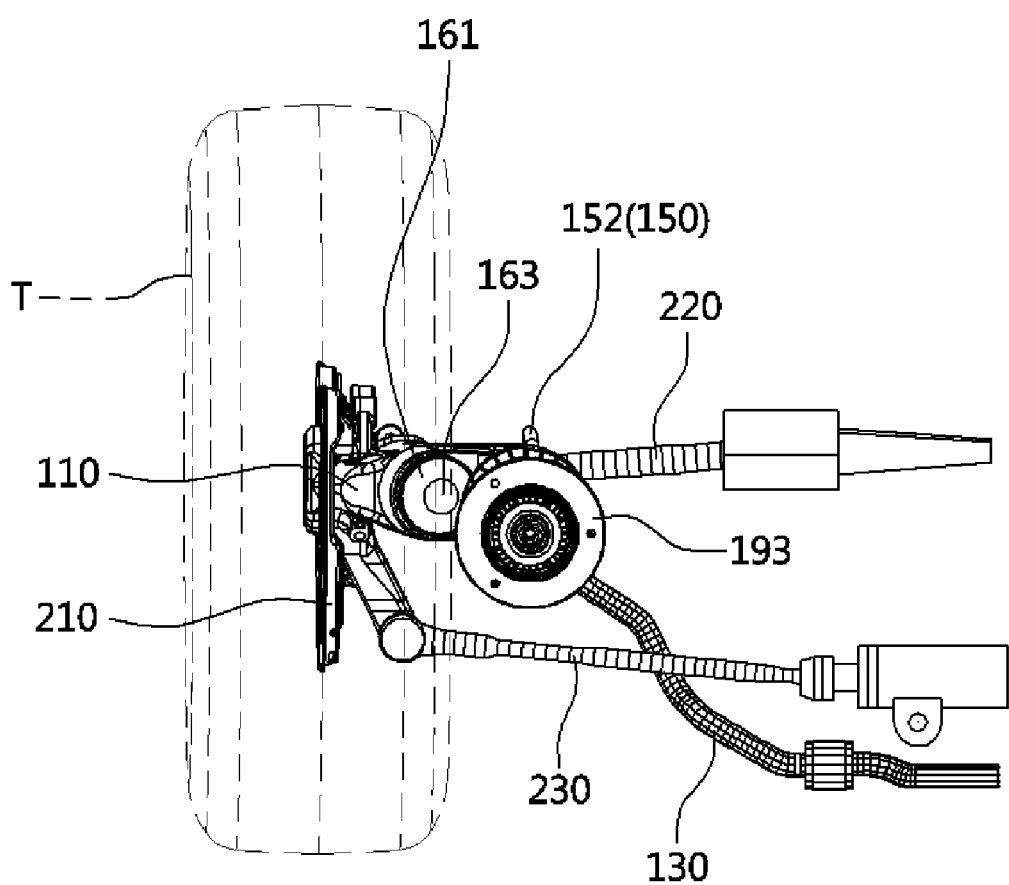
FIGS. 9 and 10 are plan views illustrating an action of preventing the strut from rotating when the vehicle is steered.
Figure 10:
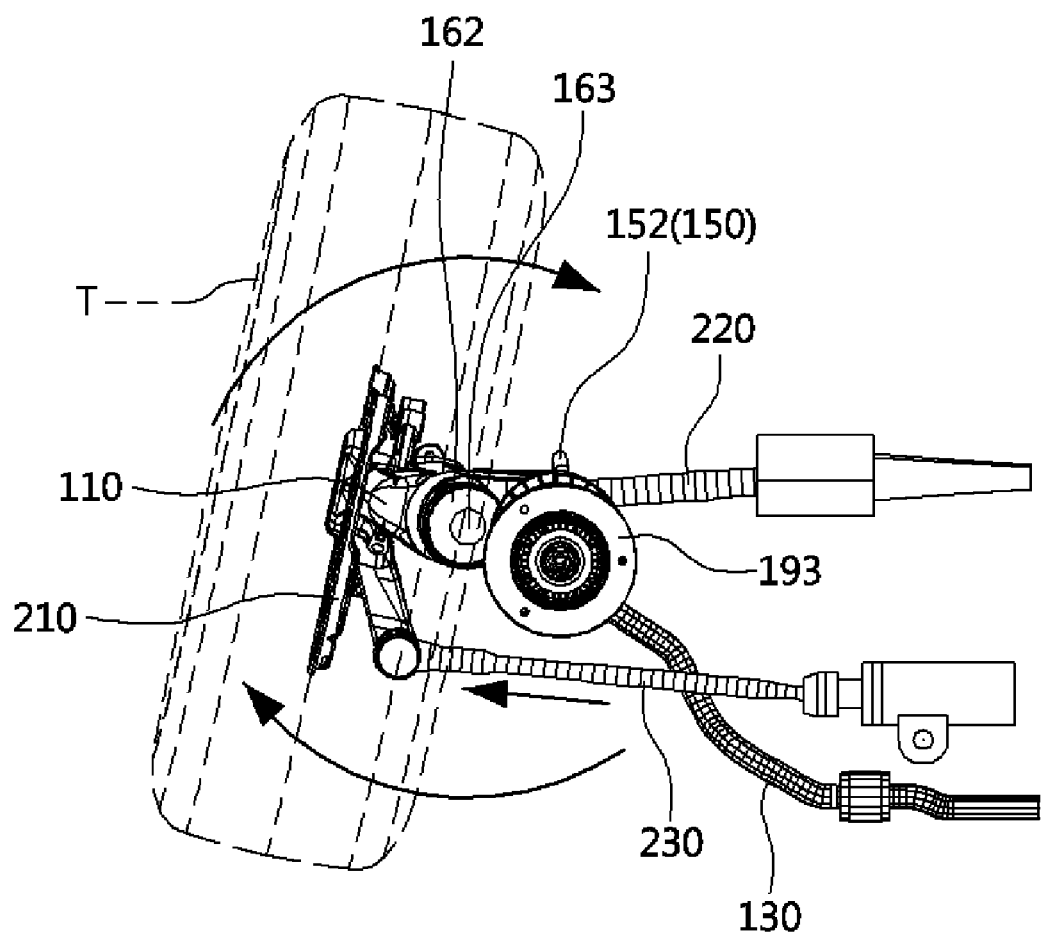

Referring to FIGS. 9 and 10, when the steering shaft 230 is moved leftward or rightward by a steering operation of the steering system, the knuckle arm 110 and the frame 210 and the wheel T, which are coupled thereto, are rotated in a steering direction on the rotating shaft 163 as a rotational center by a pushing or pulling force transferred by the steering shaft 230 connected to a position eccentric toward one side of the rotating shaft 163.

When the steering operation of the steering system is performed as described above, since the support portion 160 supporting the strut 170 is integrally coupled and fixed by the stabilizer link 150, the strut 170 and the components of the suspension system which are connected to the top thereof are prevented from rotating.

As described above, since the present invention is configured to separate the steering movement and the suspension movement, a steering property and control stability may be improved by reducing steering frictional resistance while steering is manipulated. Also, since it is configured that the strut 170 is prevented from rotating by a structure in which the stabilizer link 150 is integrally coupled to the support portion 150 without adding additional components configured to prevent the strut 170 from rotating, the structure of the strut suspension system 100 may be simplified so as to reduce the number of components and manufacturing costs.

Also, since a conventional double wishbone type system includes a structure in which one ends of an upper control arm and a lower control arm which have a pair of V-shapes or Y-shapes are installed on a vehicle body while being vertically spaced apart and other ends of the upper control arm and the lower control arm are connected to a knuckle arm by ball joints, a large installation space is occupied and a structure is complicated disadvantageously. However, in comparison to the above, in the present invention, since a single control arm is connected to a bottom of the knuckle arm 110 and the upper control arm of the conventional double wishbone type system is omitted, a mechanical structure becomes more simplified and an installation space is reduced in comparison to the conventional wishbone type suspension system so that there is an advantage in securing a space for installing main components such as an engine and the like.

As described above, since the strut suspension system 100 according to the present invention overcomes disadvantages of conventional Macpherson type systems and conventional double wishbone type systems and has advantages thereof as well as including the simplified mechanical structure, a steering property and control stability may be improved by reducing steering frictional resistance, manufacturing costs may be reduced and a large space in the vehicle body may be secured by simplifying the structure so that space availability for installing main components such as an engine and the like may be increased.

As described above, the present invention is not limited to the above described embodiments, clear modifications of the present invention may be made by those skilled in the art without departing from the technical spirit of the present invention claimed by the appended claims, and the modifications fall within the scope of the present invention.

In a strut suspension system according to the present invention, a stabilizer link is integrally coupled to a support portion supporting a strut to prevent strut from rotating when steering of a vehicle is manipulated so that steering movement and suspension movement are separated to reduce steering frictional resistance so as to improve a steering property and control stability.

Also, since it is unnecessary to add an additional component configured to prevent the strut from rotating, a structure of the suspension system may be simplified so as to reduce the number of components and reduce manufacturing costs.

Also, in comparison to a conventional double wishbone type suspension system, a mechanical structure may be further simplified and an installation space may be reduced so as to secure a large space for installing main components such as an engine and the like.

What is claimed is:

1. A strut suspension system configured to absorb impact and vibrations transferred to a vehicle body from a road surface through a wheel, the strut suspension system comprising:
   a strut provided between the vehicle body and the wheel and to which a knuckle arm connecting a steering system of a vehicle to the wheel is connected to be relatively rotatable when the steering system performs steering;
   a stabilizer link having one end connected to a stabilizer bar configured to increase roll rigidity of the vehicle body and the other end coupled to prevent the strut from rotating,
   a control arm configured to support movement of the wheel is connected to a bottom of the knuckle arm with a ball joint as a medium, and
   a support portion configured to connect and support the knuckle arm and the strut to be relatively rotatable,
   wherein,
   when the steering system performs steering, the knuckle arm and the wheel are rotated in a steering direction of the steering system, and the strut is fixed by the stabilizer link and prevented from rotating,
   the stabilizer link and the stabilizer bar are separated from the knuckle arm and the control arm,
   the stabilizer link is integrally coupled to the support portion,
   the stabilizer link comprises a first coupling link coupled to one surface of the support portion, a second coupling link coupled to the other surface of the support portion, and a connection link having both ends integrally connected to the first coupling link and the second coupling link, respectively, and
   a space through which a drive shaft configured to transfer torque to the wheel passes is formed below a second support member among the first coupling link, the second coupling link, and the connection link.

2. The strut suspension system of claim 1, wherein the stabilizer link is weld-coupled to the support portion.

3. The strut suspension system of claim 1, wherein a support body, into which a rotating shaft forming a rotational center of the knuckle arm is inserted, is provided on the knuckle arm, and the support portion comprises a first support member and a second support member, which are provided at a top and bottom of the support body, into and by which the rotating shaft is inserted and supported, and into and by which the strut is inserted and supported, and the rotating shaft.

4. The strut suspension system of claim 3, wherein the stabilizer link is integrally coupled to at least one of the first support member and the second support member.

5. The strut suspension system of claim 3, wherein one side of the first support member and one side of the second support member into which the rotating shaft is inserted are provided at the top and bottom of the support body, respectively, and the other side of the first support member and the other side of the second support member into which the strut is inserted are provided on one side of the support body to come into vertical contact therewith.

6. The strut suspension system of claim 1, wherein the stabilizer bar and the stabilizer link are connected by a ball joint.

\* \* \* \* \*